United States Patent [19]
Worrell et al.

[11] Patent Number: 5,518,830
[45] Date of Patent: May 21, 1996

[54] SINGLE-COMPONENT SOLID OXIDE BODIES

[75] Inventors: Wayne Worrell, Narberth; Ping Han, Monroeville; Yoshiharu Uchimoto, Drexel Hill, all of Pa.

[73] Assignee: The Trustees of the University of Pennsylvania, Philadelphia, Pa.

[21] Appl. No.: 440,544

[22] Filed: May 12, 1995

[51] Int. Cl.$^6$ .................................................. H01M 8/10
[52] U.S. Cl. ........................ 429/31; 429/33; 427/115; 204/421
[58] Field of Search ........................ 429/31, 33, 34, 429/40, 44, 193; 427/115; 204/410, 421, 424, 426, 280, 245; 502/4

[56] References Cited

U.S. PATENT DOCUMENTS

| | | | |
|---|---|---|---|
| 3,607,424 | 9/1971 | Maki et al. | 136/86 F |
| 3,634,113 | 1/1972 | Fehrenbacher | 106/55 |
| 4,791,079 | 12/1988 | Hazbun | 502/4 |
| 4,827,071 | 5/1989 | Hazbun | 585/443 |
| 4,851,303 | 7/1989 | Madou et al. | 429/33 X |
| 4,892,849 | 1/1990 | Lankford, Jr. | 501/97 |
| 5,134,042 | 7/1992 | Madou et al. | 429/13 |
| 5,298,235 | 3/1994 | Worrell et al. | 429/33 |
| 5,387,330 | 2/1995 | Taniguchi et al. | 429/33 X |

OTHER PUBLICATIONS

Arashi, H. et al., "Investigations of Valence Change of Tb Ioins in $ZrO_2$–$Tb_4O_7$ Mixed Conductor Using xanes Measurements", *Solid State Ionics 1989*, 35, 323–327. (Month not available).

Barnett, S. A. et al., "Sputter Deposition of Yttria–stabilized Zirconia and Silver Cermet Electrodes for SOFC Applications", *Solid State Ionics 1992*, 52, 261–267. (Month not available).

Barnett, S. A., "A New Solid Oxide Fuel Cell Design Based on Thin Film Electroyltes", *Energy* 1990, 15(1), 1–9. (Month not available).

Burggraaf, A. J. et al., "Electric and Electrochemical Properties of Catalytically Active Oxygen Electrode Materials", *Solid State Ionics* 1986, 18 & 19, 807–812. (Month not available).

Cao, G. Z. et al., "Mixed Conduction and Oxygen Permeation of $ZrO_2$–$Tb_2O_{3.5}$–$Y_2O_3$ Solid Solutions" in Science and Technology of Zirconia V, Badwal, S. P. S. et al., eds., Technomic Publishing Co., Inc., Lancaster, 1992. (Month not available).

Haaland, D., "Noncatalytic Electrodes for Solid–Electrolyte Oxygen Sensors", *J. Electrochem. Soc.: Electrochemical Science and Technology* Apr. 1980, 127 (4), 796–804.

Han, P. et al., "Mixed Conductivity in Oxides Exhibiting Both P–Type Electronic and High Oxygen–Ion Conductivity", Proceedings of the 14th Riso International Symposium on Materials Science, Riso Natnl. Laboratory, Roskilde, Denmark, 1993, pp. 461–466. (Month not available).

Han, P. and Worrell, "Electrical Properties of Mixed–Conducting Yttria–Stabilized Zirconia–Terbia", from Ionic and Mixed Conducting Ceramics, PV 94–12, Ramanarayanan et al,. eds., The Electrochemical Society Proceeding Series, Pennington, NJ, 1994. (Month not available).

(List continued on next page.)

*Primary Examiner*—Anthony Skapars
*Attorney, Agent, or Firm*—Woodcock Washburn Kurtz Mackiewicz & Norris

[57] ABSTRACT

Single-component bodies useful in fuel cells and other electrochemical devices are provided. In preferred embodiments, the single-component bodies comprise an anodic region at a first side, a cathodic region at a second, non-adjacent side, and an oxygen ion-conducting region substantially free from anodic or cathodic character disposed between said anodic and cathodic regions. The single-component bodies comprise oxide electrolytes such as yttria-stabilized zirconia doped with multivalent cations such as titanium or terbium.

19 Claims, 7 Drawing Sheets

OTHER PUBLICATIONS

Iwahara, H. et al., "Mixed Conduction and Oxygen Permeation in Sintered Oxides of a System $ZrO_2$–$Tb_4O_7$", *Advances in Ceramics* 1988, 24, 907–914. (Month not available).

Kleitz, M., "Recent Developments in Oxygen sensing with a Solid Electrolyte Cell", from Proceedings of the Int. Meeting on Chemistry Sensors, vol. 17, Analytical Chem. Symp. Series, Elsevier, NYC, 1983, pp. 262–272. (Month not available).

Liou, S. S. and Worrell, "Electrical Properties of Novel Mixed–Conduction Oxides", *Appl. Phys. A* 1989, 49, 25–31. (Month not available).

Lukaszewicz, J. et al., "A $LaF_3$–Based Oxygen Sensor With Perovskite–Type Oxide Electrode Operative at Room Temperature", *Sensors and Actuators* 1990, B1, 195–198. (Month not available).

Minh, N., "Ceramic Fuel Cells", *J. Am. Ceram. Soc.* Mar. 1993, 76(3), 563–588.

Mizusaki, J. et al., "Nonstoichiometrya nd defect Structure of the Perovskite–Type Oxides $La_{1-x}Sr_xFeO_{3-\delta}$", *J. of Solid State Chemistry* 1985, 58, 257–266. (Month not available).

Mizusaki, J. et al., "Electronic Conductivity, Seebeck Coefficient, and Defect Structure of $La_{1-x}Sr_xFeO_3(X=0.1,0.25)$", *J. of the Am. Ceramic Soc.* Apr. 1983, 66(4), 247–252.

Teraoka, Y. et al., "Mixed Ionic–Electronic Conductivity of $La_{1-x}Sr_xCO_{1-y}Fe_yO_{3-\delta}$", *Mat. Res. Bull.* 1988, 23, 51–58. (Month not available).

Van Dijk, M. P. et al., "Oxygen Ion and Mixed Conductivity in Compounds With the Fluorite and Pyrochlore Structure", *Solid State Ionics* 1983, 9 & 10, 913–919. (Month not available).

Van Dijk, M. P. et al., "Electrical Conductivity and Defect Chemistry of the System $(Tb_xGd_{1-x})_2Zr_2O_{7+y}(O \leq y<0.25)$", *Solid State Ionics* 1985, 16, 211–224. (Month not available).

Worell, W., "Electrical Properties of Mixed–Conducting Oxides Having Oxygen–Ion Conductivity", *Solid State Ionics* 1992, 52, 147–151. (Month not available).

Worrell, W. and Liou, "Mixed –Conducting Oxide Electrodes For Solid Oxide Fuel Cells", Proceedings of the First Int. Symposium on Solid Oxide Fuel Cells, Singhal, S. Ed., vol. 89011, The Electrochemical Soc., Pennington, NJ, 1989. (Month not available).

Worrell, W. et al., "Investigation of the Electronic Conduction Mechanism in Yttria–Stabilized Zirconia–Titania", Proceedings of the First Int. Symposium on Ionic and Mixed Conducting Ceramics, Ramanarayanan, T. A., ed., The Electrochemical Society, Pennington, NJ, 1991, vol. 91–12, pp. 73–83. (Month not available).

Worrell, W., "Solid–State Electrochemical Sensors", Proceedings of the Symposium on Electrochemistry and Solid State Science Education at the Graduate and Undergraduate Level, Smyrl, W., ed., The Electrochemical Society, Pennington, NJ, 1987, pp. 98–109. (Month not available).

SINGLE-COMPONENT SOLID OXIDE BODIES

FIELD OF THE INVENTION

This invention relates to electrochemical devices incorporating solid oxide bodies, to solid oxide fuel cells useful in the generation of electric current, and to solid oxide fuel cells fabricated from single-component solid oxide bodies.

BACKGROUND OF THE INVENTION

Solid oxide fuel cells (SOFCs) operate by converting chemical energy directly to electricity by way of an isothermal electrochemical oxidation process that is not governed by the Carnot cycle thermodynamics characteristic of other energy conversion devices. SOFCs typically possess efficiencies approaching 80 percent and therefore require lower energy input to produce a specific amount of power. Additionally, SOFC performance is relatively independent of the power plant size.

During operation of a SOFC, an oxidant such as air or some other oxygen-containing medium typically is introduced at a cathodic portion of the fuel cell, and a fuel such as hydrogen, carbon monoxide, natural gas, or coal-derived gas is introduced at an anodic portion. Upon application of an external load, oxygen at the cathode (air electrode) reacts with incoming electrons from an external circuit to generate oxygen ions, which then migrate to the anode (fuel electrode) through an oxygen ion-conducting electrolyte within the body of the fuel cell. At the anode, the fuel is electrochemically oxidized with these oxygen ions to liberate electrons to an external circuit. The oxidation occurring at the fuel electrode causes current to flow through the external circuit, returning electrons to the air electrode to form more oxygen ions.

Traditionally, solid oxide fuel cells have been fabricated as multiple-component assemblages such as laminates which during operation suffer from a variety of problems attributable to thermal, mechanical, and chemical incompatibilities between each component. These problems have included poor fuel tolerance, limited chemical and thermal endurance, complex and expensive fabrication techniques, and poor mechanic durability. For example, many multiple-component fuel cells can only be energized and de-energized a few times before the component layers de-laminate due to differential thermal expansion and contraction.

Accordingly, there exists a need for new fuel cells which eliminate or at least minimize the problems associated with multiple component structures.

OBJECTS OF THE INVENTION

It is therefore one object of the invention to provide electrochemical devices such as solid oxide fuel cells having simpler designs, fewer fabrication problems, higher durability, and lower processing costs than those known in the art.

It is a further object of the invention to provide such features in single-component solid oxide fuel cells (SCOFCs) having the required electrical, electrochemical, chemical, and catalytic properties.

It is a still further object to provide SCOFCs capable of operating in a moderate temperature range (800° C. or less), to provide additional advantages such as reduced materials costs and improved cell performance.

SUMMARY OF THE INVENTION

These and other objects are achieved by the present invention, which provides electrochemical devices such as fuel cells comprising multi-sided, single-component bodies which, in turn, comprise an anodic region at a first side, a cathodic region at a second side not adjacent the first side, and an oxygen ion-conducting region substantially free from anodic or cathodic character disposed between the anodic and cathodic regions. In certain embodiments, the single-component bodies comprise oxide electrolytes doped with multivalent cations. Also provided are multi-sided, single-component, bodies having either an anodic region or a cathodic region at a single side.

The present invention also provides methods for fabricating single-component solid oxide fuel cells. In certain embodiments, these methods comprise the steps of providing a single-component body comprising an oxide electrolyte having the formula:

$$R_xM_{1-x}O_{2-x/2} \tag{1}$$

wherein R is at least one rare earth element such as yttrium, scandium, samarium, ytterbium, calcium, or strontium; M is at least one metal selected from the group consisting of zirconium, cerium, and bismuth; and x is from about 0.05 to about 0.25. The processes further comprise contacting a first side of such a body with a first dopant to form an anodic region at the first side, and/or contacting a second, non-adjacent side of the body with a second dopant to form a cathodic region at the second side. Said contacting is effected such that the anodic region is separated from the cathodic region by an oxygen ion-conducting region substantially free from dopant. In certain embodiments, only one side is contacted with dopant to form either an anodic or a cathodic region. The anodic region preferably has the formula:

$$R_pM_{1-p-q}Ti_qO_{2-\delta} \tag{2}$$

where R and M are as defined above, Ti is titanium, p is from about 0.113 to about 0.214, q is from about 0.089 to about 0.236, and δ represents oxygen vacancies. Preferably, p is from about 0.148 to about 0.182 and q is from about 0.134 to about 0.189. The cathodic region preferably has the formula:

$$R_pM_{1-p-r}Tb_rO_{2-\delta} \tag{3}$$

where R, M, p, and δ are as defined above, Tb is terbium, and r is from about 0.179 to about 0.330, preferably from about 0.223 to about 0.283.

The single-component oxide fuel cells (SCOFCs) of the present invention are provided using a new materials approach to the development of efficient, fuel-tolerant fuel cells. Single-component cells eliminate the mechanical and chemical compatibility problems associated with current designs, and also provide significant technological advantages, including simplified cell design, fewer fabrication problems, and lower processing costs as compared with solid oxide fuel cells of the prior art.

The catalytic, electrochemical, and chemical characteristics of the provided novel fuel cell systems are ideally suited for the development of high efficiency, thin-film, SCOFCs operating in the temperature range of approximately 600° C. to 800° C. An SCOFC operating in the moderate temperature range of 600° C. to 800° C. offers additional advantages in reducing materials costs and improved cell performance. These advantages include the elimination of the high temperature corrosion of system components, ease of multiple-cell stack sealing, and increased options for interconnection materials including metals and alloys.

BRIEF DESCRIPTION OF THE FIGURES

The numerous objects and advantages of the present invention may be better understood by those skilled in the art by reference to the accompanying figures, in which.

DETAILED DESCRIPTION OF THE INVENTION

The present invention applies a new materials approach to produce electrochemical devices containing single-component bodies. Devices such as fuel cells are based on a single oxide component in which the appropriate conduction characteristics are produced either by chemically modifying oxide electrolytes to produce n-type mixed-conducting anode regions and/or p-type mixed-conducting cathode regions. Other electrochemical devices such as oxygen sensors are based on a single component in which an oxide electrolyte is modified to produce either an n-type mixed-conducting anode region or a p-type mixed-conducting cathode region. It will be understood that the term "mixed conducting" as employed herein denotes a region exhibiting both oxygen-ion and electronic (n- or p-type) conductivity.

Figure 1:
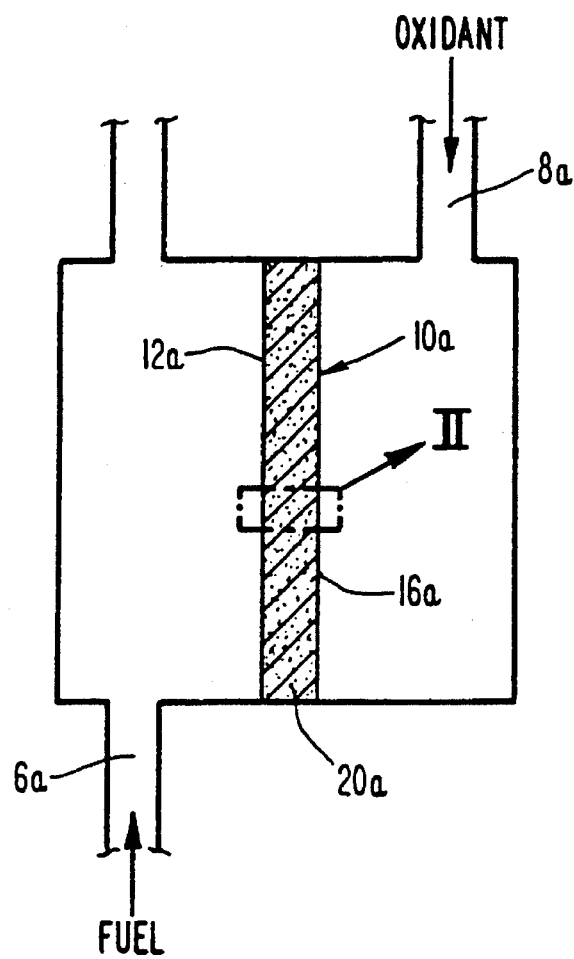
FIG. 1 is a cross-sectional view of a planar fuel cell of the invention.
Figure 2:
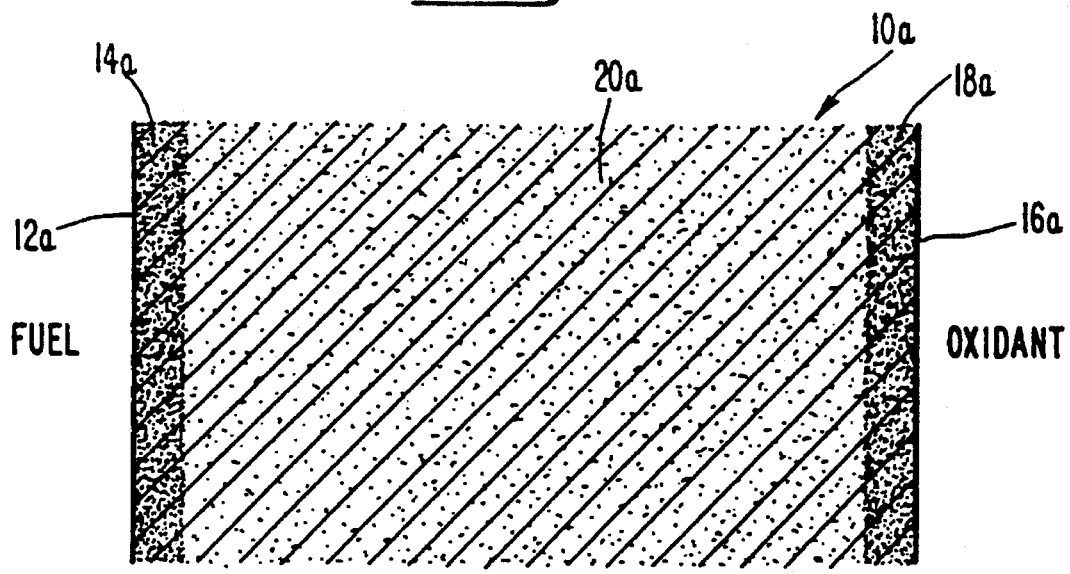
FIG. 2 is a cross-sectional view of the planar fuel cell shown in FIG. 1, as indicated by lines IIa—IIa and IIb—IIb.
Figure 3:
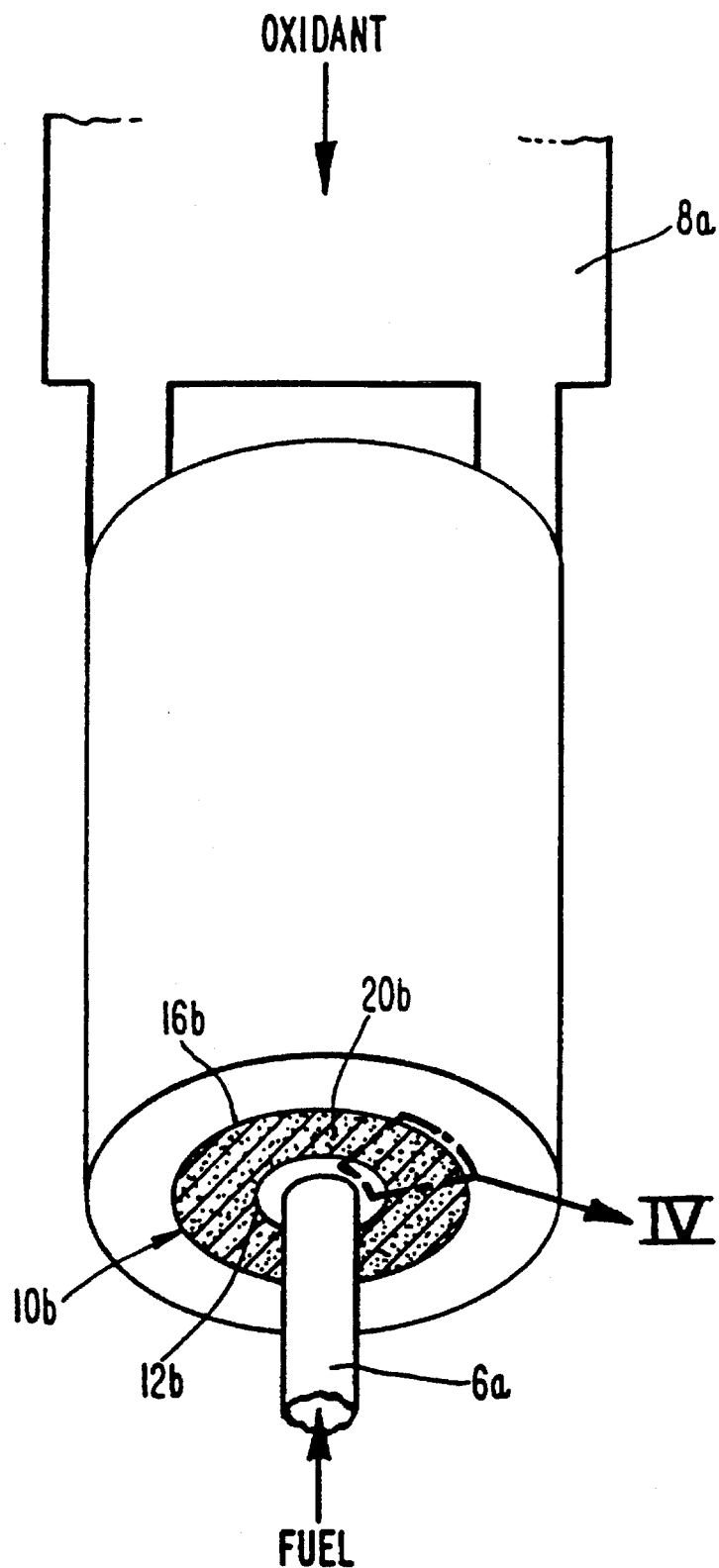
FIG. 3 is a perspective cross-sectional view of a tubular fuel cell of the invention.
Figure 4:
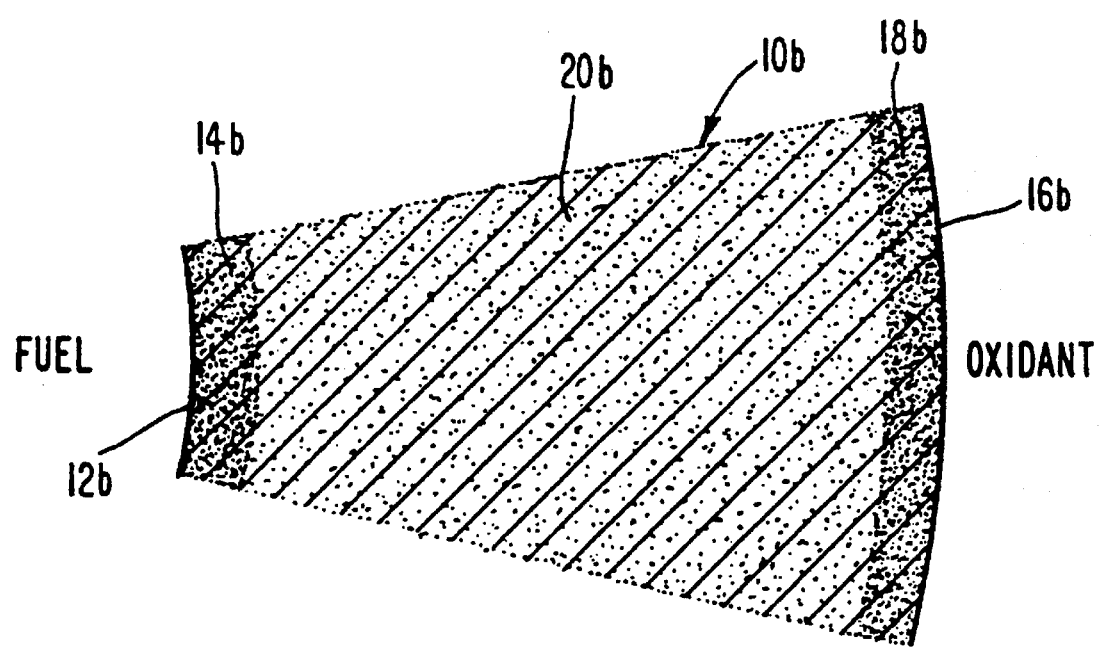
FIG. 4 is a cross-sectional view of the tubular fuel cell shown in FIG. 3, as indicated by lines IVa—IVa and IVb—IVb.

The single-component bodies of the present invention can be used in virtually any known solid oxide fuel cell design. Preferred, non-limiting, fuel cell designs are shown in FIGS. 1–4, wherein first sides 12a,b of single-component bodies 10a,b are in contact with fuel provided via means 6a,b and second, non-adjacent sides 16a,b are in contact with oxidant provided by conduits 8a,b or some other suitable means. The bodies individually comprise n-type mixed conducting anodic regions (14a,b) at the first sides, p-type mixed conducting cathodic regions (18a,b) at the second sides, and oxygen ion-conducting regions (20a,b) disposed between the n-type and p-type regions. A tubular fuel cell design is indicated by FIGS. 3 and 4, wherein the first side (12b) and the second side (16b) are somewhat concentric.

As will be recognized, the single-component bodies of the invention also can be used a wide variety of other electrochemical devices. For example, a multi-sided, single-component body having either an n-type mixed conducting anodic region or a p-type mixed conducting cathodic region at one side can used in fabricating oxygen sensors of the type generally disclosed by, for example, Logothetis, *Adv. in Ceramics*, 1981, 3, 388–405; Haaland, *J. Electrochem.*, 1980, 127, 796–804; Worrell, Proc. of Symp. on Electrochemistry and Solid State Science Education, ed. by Smyrl and Mclarnon, pp. 98–109, The Electrochemical Society, Pennington, N.J. (1987); Kleitz, et al., Proceed of the Int. Meeting on Chem. Sensors, Vol. 17, Anal. Chem. Symp. Series, pp. 262–272, Elsevier, N.Y.C. (1983); and Lukaszewicz, et al., *Sensors and Actuators*, 1990, B1, 195–198.

In certain embodiments, the single-component bodies of the present invention are fabricated from oxide electrolytes containing multivalent ions. In preferred embodiments, oxide electrolytes have formula (1):

$$R_xM_{1-x}O_{2-x/2} \tag{1}$$

wherein R is a rare earth element such as yttrium, scandium, samarium, ytterbium, calcium, or strontium; M is a metal such as zirconium, cerium, or bismuth; and x is from about 0.05 to about 0.25. Preferred oxide electrolytes are those that contain yttrium or scandium, with oxides having formula $Y_xZr_{1-x}O_{2-x/2}$ (yttria-stabilized zirconia; YSZ) being particularly preferred. The selected oxide electrolyte should possess good chemical stability and high oxygen ion conductivity at the fuel cell operating temperatures.

The chemistry of these oxides is modified in accordance with the present invention to provide either n- and p-type mixed conduction, respectively, at the opposing sides or n- or p-type conduction at a single side. For example, catalytically active, low resistance, n- and p-type mixed conducting yttria-stabilized zirconia (YSZ) can be produced by doping YSZ with, for example, titania or terbia, respectively. In one preferred embodiment, titania (titanium oxide) is introduced into one side of the oxide electrolyte having formula (1) to produce n-type conductivity and a mixed-conducting anode having formula (2):

$$R_pM_{1-p-q}Ti_qO_{2-\delta} \tag{2}$$

where R and M are as defined above, Ti is titanium, p is from about 0.113 to about 0.214, q is from about 0.089 to about 0.236, and δ represents oxygen vacancies. Preferably, p is from about 0.148 to about 0.182 and q is from about 0.134 to about 0.189.

One unique property of these YSZ-titania regions is that they exhibit mixed oxygen-ion and n-type electronic conductivity at oxygen pressures below $10^{-12}$ atmospheres. This is believed to be due to the presence of both $Ti^{4+}$ and $Ti^{3+}$, and the associated electron hopping which occurs in low oxygen pressure environments. See, e.g., Worrell, Proceedings of the EPRI/GRI Workshop on Ceramic Conductors for Solid State Electrochemical Devices, Snowbird, Utah, May 12–15, 1991; Worrell, et al., Proceedings of the First International Symposium on Ionic and Mixed Conducting Ceramics, ed. by Ramanarayanan and Tuller, Proceedings Volume 91-12, Worrell, et al., Solid Oxide Fuel Cells, ed. by Singhal, Proceedings Volume 89-11, pp. 81–89, The Electrochemical Society, Pennington, N.J. (1989).

The percentage of n-type electronic conductivity in, for example, YSZ-titania solutions of the invention can be varied from 0 to about 100 mole percent by changing the amount of the titania addition. Preferred compounds have 10 to about 25 mole percent, more preferably 15 to about 20 mole percent titania. One procedure for dissolving titania into YSZ is disclosed by Worrell, et al., Solid Oxide Fuel Cells, ed. by Singhal, Proceedings Volume 89-11, pp. 81–89, The Electrochemical Society, Pennington, N.J. (1989). A wet-chemical co-precipitation method also has been used to obtain a homogeneous distribution of titanium cations in YSZ. The appropriate mixtures of the three solutions ($ZrOCl_2$-$8H_2O$, $YCl_3$-$6H_2O$ and $TiCl4$ dissolved in distilled water) were added to distilled $NH_4OH$ to obtain YZTi hydroxide precipitates. The precipitated hydroxides were then heated at various temperatures and in different atmospheres to maximize the titania solubility in YSZ. X-ray diffraction results show that the decrease in the YZTi lattice parameter with increasing titania concentration is in excellent agreement with previous results (see, Liou and Worrell, *Appl. Phys.* 1989, A49, 25; Liou and L. Worrell, in Solid Oxide Fuel Cells, S. Singhal, Editor, PV 89-11, p. 81, The Electrochemical Society Proceeding Series, Pennington, N.J. (1989)). However, the maximum titania solubility in the cubic-fluorite YSZ phase has been increased by using the co-precipitation method. For example, recent results indicate that the maximum solubility of titania ($TiO_2$) in the cubic-fluorite phase of 12 mole % yttria-stabilized zirconia (Y12SZ) heated in air at 1500° C. is between 20 and 25 mole %.

The n-type electronic conductivity of YZTi becomes significant when the oxygen pressure is below about $10^{-15}$ atm due to the presence of both $Ti^{+3}$ and $Ti^{+4}$ cations and the associated electron hoping which occurs in these very low oxygen-pressure environments. Because typical oxygen pressures at the fuel-gas anode in a SOFC vary from $10^{-15}$ to $10^{-22}$ atm, a YSZ surface region containing titanium cations would have excellent mixed (oxygen-ion and n-type electronic) conductivity. The electronic conductivity of titanium-doped YSZ increases not only with decreasing oxygen pressure but also with increasing titania concentration and temperature. For example, the electronic conductivity of YZTi20 (YSZ containing 20 mole % titania) is higher than that of YZTi10 in the same oxygen-pressure and temperature environment.

A 5 to 10 mole percent variation in the titania concentration increases the percentage of electronic conductivity from 10 to 85 percent at 800° C. Typical oxygen pressures at the fuel-gas electrode (anode) are $10^{-18}$ to $10^{-22}$ atm. Under these conditions a surface region of yttria-stabilized zirconia containing titania would have excellent n-type, mixed conductivity. U.S. Pat. Nos. 4,791,079 and 4,827,071, both in the name of Hazbun, confirmed that yttria-stabilized zirconia-titania is also an effective catalytic membrane for hydrocarbon conversion. Other oxides can be employed in accordance with the present invention to produce n-type electronic conductivity in oxide-electrolyte surface regions at low oxygen pressures. The most likely candidates are oxides that show a significant range of solid solubility in the fluorite lattice of the oxide electrolyte and can be stabilized in a mixed valence state under the reducing conditions experienced at the anode.

N-type mixed conducting surface regions can be established in oxide electrolytes through substitution for tetravalent M using cations with accessible trivalent states. In addition to titanium, other systems include $Ce^{4+/3+}$, $Pr^{4+/3+}$, coupled $(R)^{3+}$-$Nb^{5+}$ substitutions leading to $Nb^{4+}$ formation under reducing conditions, and vanadium oxides.

Because YZTi is not a mixed-conductor in high oxygen-pressure (e.g., air) environments due to the absence of $Ti^{+3}$ cations and the associated electronic conductivity, another multivalent-cation must be present in YSZ to produce a useful cathode surface. In the air environment of the cathode, the best multivalent-cation would be the one which provides the highest p-type electronic conductivity with no significant degradation of the oxygen-ion conductivity in YSZ.

Mixed (oxygen-ion and p-type electronic) conductivity has been reported in $Tb_2Zr_2O_7^{+\delta}$ and $Gd_2Zr_2O_7$ zirconates, pyrochlores $(Tb_xGd_{1-x})_2Zr_2O_{7+\delta}$, terbiazirconia cubic-fluorite $(ZrO_2)_{1-x}(Tb_2O_{3.5})x$, and $(ZrO_2)_{1-x-y}(Tb_2O_{3.5})x(Y_2O_3)y(11)$. Furthermore, the coexistence of both trivalent and tetravalent terbium cations in-cubic fluorite $ZrO_2$-$Tb_2O_{3.5}$ solid solutions has been confirmed using the X-ray-absorption near-edge structure technique.

Mixed-conducting p-type cathodic regions can be established in oxide electrolytes having formula (1) by, for example, substitution of trivalent R-stabilizing cations by ions with stable $3^+/4^+$ mixed valences under high oxygen pressure, or by substitution of tetravalent M by cations with stable $4^+/5^+$ states. P-type mixed conducting regions preferably are produced by introducing terbia (terbium oxide) into one side of the oxide electrolyte having formula (1) to produce p-type conductivity and a mixed-conducting cathode having formula (3):

$$R_pM_{1-p-r}Tb_rO_{2-\delta} \qquad (3)$$

where R, M, p, and δ are as defined above, Tb is terbium, and r is from about 0.179 to about 0.330, preferably from about 0.223 to about 0.283.

Multivalent cations that produce significant p-type conductivity at stabilized oxide electrolyte surfaces have stable mixed-valences under oxidizing conditions. For example, terbium (Tb) substitutions in both zirconia and ceria (cerium oxide) can lead to the formation of outstanding p-type mixed conductors with conductivities exceeding $10^{-2}$ S.cm$^{-1}$ at 700° C. See, e.g., Burgraaf, et al., *Solid State Ionics,* 1986, 18/19, 807 and Van Dijk, et al., *Solid State Ionics,* 1983, 9/10, 913.

The percentage of p-type electronic conductivity in, for example, YSZ-titania solutions of the invention can be varied from 0 to about 100 mole percent by changing the amount of the terbia addition. Preferred compounds have 20 to about 35 mole percent, more preferably 25 to about 30 mole percent terbia.

As will be recognized, the oxide electrolytes $R_xZr_{1-x}O_{2-x/2}$ and $R_{1-x}Ce_{1-x}O_{2-x/2}$ generally crystallize in fluorite-related structures for x less than 0.5. When x equals 0.5 they can be stabilized in the pyrochlore structure which is an ordered variant of fluorite. P-type mixed conduction can be introduced into both structure types using cations with variable valency, in particular by Tb-substitutions. The stabilization of $Tb^{4+/3+}$ mixed valences in air at temperatures between approximately 600° C. to 900° C. leads to significant p-type electronic conductivities. By controlling the total Tb content, and by using different thermal treatments to produce fluorite, pyrochlore and fluorite-pyrochlore nano-composite structures, the percentage of the electronic contribution to the total conductivity of both ceria and zirconia oxides can be varied from 0 to 100 percent. For excellent cathodic behavior, the optimum multivalent-cation ratio that produces significant p-type conductivity in yttria-stabilized zirconia must be stable in an oxidizing environment such as air. Thus, terbia-substituted YSZ is a preferred cathode surface. Other oxides which can be employed in accordance with the present invention to produce p-type mixed-conducting regions in oxide electrolytes of formula (1) at high oxygen pressures include the oxides of bismuth and those of transition metals such as iron, manganese, and vanadium which exhibit multiple oxidation states in air.

Mixed-conducting YZTb has been prepared by dissolving terbia ($TbO_{1.75}$) into YSZ using the citrate synthesis method (see, e.g., Han, et al., in High Temperature Electrochemical Behavior of Fast Ion and Mixed Conductors, p. 461, Poulsen, et al., Editors, 14th Riso International Symposium on Materials Science, Riso National Laboratory, Roskilde, Denmark (1993); and Han and Worrell, in Ionic and Mixed Conducting Ceramics, PV 94-12, p. 317, Ramanarayanan, et al., Editors, The Electrochemical Society Proceeding Series, Pennington, N.J. (1994)). The cubic-fluorite phase is retained in YZTb at terbia concentrations as high as 50 mole percent. Measurements of the total electrical and partial electronic conductivities of these solid solutions show that YZTb2O (YSZ containing 20 mole % $TbO_{1.75}$) and YZTb3O have significant oxygen-ion and p-type electronic conductivities. The observed increases in the p-type electronic conductivity with increasing oxygen pressure ($10^{-5}$ to 1 atm) indicate that the hole conductivity is related to the increasing $Tb^{+4}$ content. The oxygen-ion conductivity decreases with increasing terbia content, presumably due to the oxygen vacancy-cation interactions. Results indicate that YSZ containing terbium has excellent mixed (oxygen-ion and p-type electronic) conductivity, providing fundamental information that can be used to optimize the terbium-cation composition in the cathodic surface of a YSZ electrolyte.

Many of the oxide electrolytes having formula (1) exhibit low oxygen-ion conductivities in the 600° C.–800° C. temperature range. They usually require the use of thin films to achieve useful current densities, particularly at the lower temperatures. The oxide electrolyte can be fabricated into the form of a dense, crack- and pore-free film about 1 to about 10 microns thick using a number of thin-film technologies such as magnetron sputtering. See, e.g., Barnett, *Energy*, 1990, 5, 1 and Barnett, et al., Proceedings of the EPRI/GRI Workshop on Ceramic Conductors for Solid State Electrochemical Devices, Snowbird, Utah, May 12–15, 1991. The use of magnetron sputtering, where the sputtered fluxes from metal targets are reacted with oxygen gas at the depositing film, has been shown to provide much higher deposition rates than sputtering from ceramic targets. Another attractive technology is electrochemical vapor deposition (EVD), which has been used to prepare thin films of yttria-stabilized zirconia and yttria-stabilized titania. See, e.g., U.S. Pat. Nos. 4,791,079 and 4,827,071, both in the name of Hazbun.

At a given current density, the maximum performance and efficiency of a SOFC occur with those electrodes having the minimum overpotential losses. An ideal SOFC is one in which the anode and the cathode overpotentials are negligible and the ohmic resistance losses are minimal during cell operation. Thus a major factor in the optimization of mixed-conducting YSZ surfaces for SOFC electrode applications is the minimization of their overpotentials.

Mixed-conducting YZTi anodes have been prepared by mixing, for example, Y8ZTi2O (8 mole % $Y_2O_3$ and 20 mole % $TiO_2$) powders with polyethylene glycol, painting the slurry on a Y8SZ electrolyte, and then heating at 1400° C. for 2 hours in air. A Ni/Y8SZ cermet anode has also been made by mixing YSZ and NiO powders with polyethylene glycol, painting the mixture on the YSZ electrolyte and heating at 1400° C. for 2 hours in air. The overpotentials of the Y8ZTi1O, the Y8ZTi2O and a Ni(30 vol %)/Y8SZ cermet anode have been measured using the current-interruption method in a three-electrode configuration. In these measurements, the anode discs are typically 8–10 microns thick with a radius of about 0.48 cm and a surface area of 0.725 $cm^2$. The measured overpotentials of the Y8ZTi1O and the Y8ZTi2O anodes at 915° C. are compared with those of a Ni(30 vol %)/Y8SZ cermet anode in FIG. 4. Although the overpotentials of the mixed-conducting Y8ZTi1O anode are higher than those of the Ni(30 vol %)/Y8SZ cermet anode, the overpotentials of the Y8ZTi2O anode are much lower than both the Y8ZTi1O and the Ni(30 vol %)/Y8SZ cermet anodes. The lower overpotentials of the Y8ZTi2O anode are believed due to its higher electronic conductivity and the associated increase in the charge-transfer reaction area.

Figure 5:
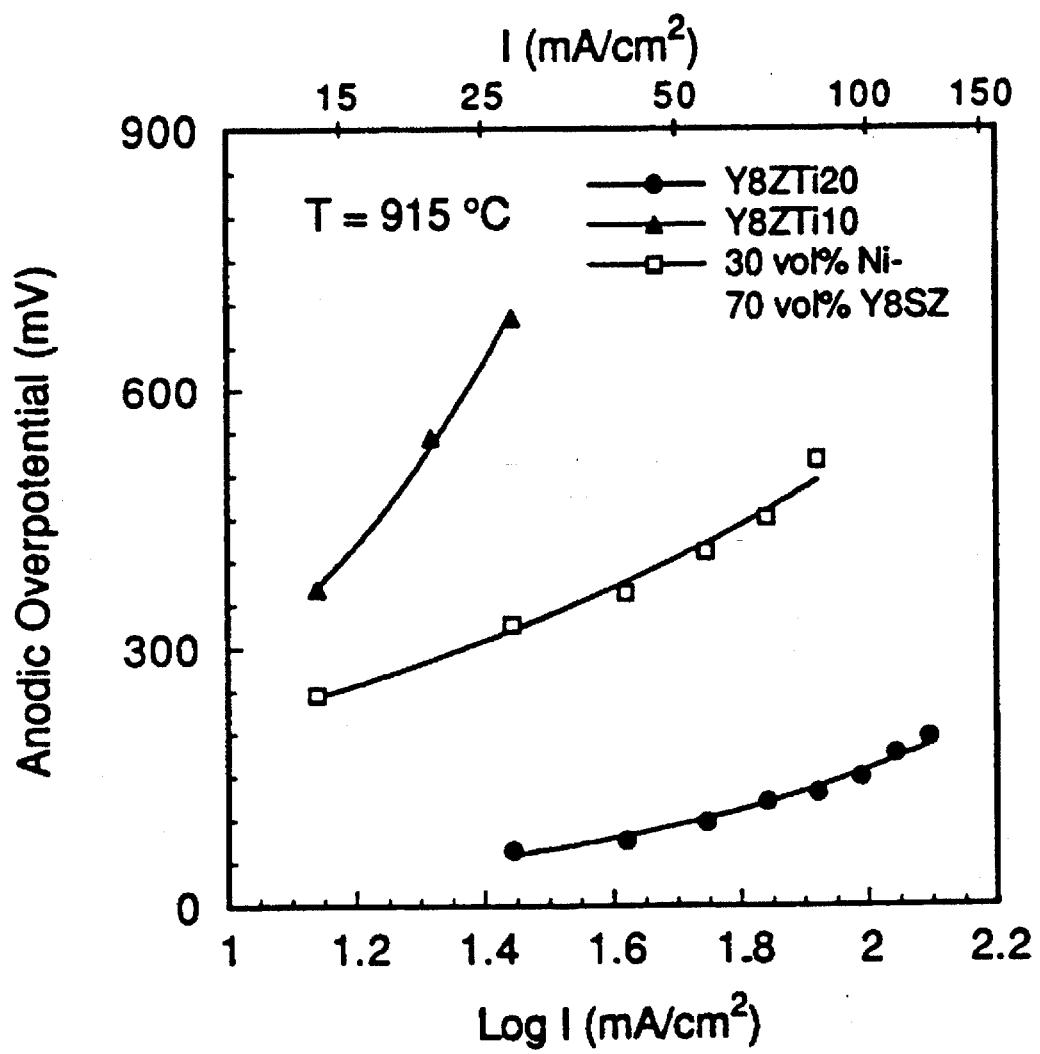
FIG. 5 is a plot showing comparison of the overpotentials of $Y_8ZTi_{10}$ and $Y_8ZTi_{20}$ anodes with that of the Ni(30 vol %)/$Y_8SZ$ cermet anode at 915° C. and $2\times10^{-18}$ atm $P_{O2}$.

Impedance spectroscopy measurements also indicate that the Y8ZTi2O anode has a low interfacial resistance, which is in agreement with the low overpotentials shown in FIG. 5. The preparation technique, the starting particle size, the composition, porosity and thickness of the Y8ZTi2O anodes can be being optimized to provide even lower anode overpotentials than those shown in FIG. 5.

Mixed-conducting Y8ZTb2O and Y8ZTb3O cathodes have been prepared using the procedures described above for the Y8ZTi2O anodes. (see, e.g., Han and Worrell, in Ionic and Mixed Conducting Ceramics, PV 94-12, p. 317, Ramanarayanan, et al., Editors, The Electrochemical Society Proceeding Series, Pennington, N.J. (1994)). The preparation of the Tb3OA and Tb2OA cathodes shown in FIG. 6 consisted of first annealing the powders for 12 hours in oxygen at 1600° C., mixing with polyethylene glycol, and then painting the slurry on the YSZ. The geometric cross-section area of the two Tb3OA cathode discs were 0.445 and 0.458 $cm^2$. The preparation technique for Tb3OB cathode was essentially the same except that the powders were not annealed at 1600° C. This cathode disc had a geometric cross-section area of 0.437 $cm^2$. The preparation of the Tb3OC and Tb2OC cathodes was the same as that for Tb3OB except that the painted slurry's annealing time was 10 hours instead of 2 hours. The cross-section areas were 0.737 $cm^2$ for Tb3OC and 0.463 and 0.288 $cm^2$ for the two Tb2OC cathodes. The preparation of the Tb3OD cathode was the same as that for the Tb3OC cathode except that smaller starting powders were used. The resulting geometric cross-section area was 0.29 $cm^2$.

The porosity and thicknesses of the six Y8ZTb cathodes were examined using scanning electron microscopy. As shown in the parenthesis of the cathode-identification column of FIG. 6, the cathode thicknesses varied from $\leq 10$ to 17 microns except for the Tb2OA cathode (40 μm thickness), which was prepared using platinum gauze as a template on the YSZ surface before brush painting. No sintering of the larger (about 10 μm in size) and nonuniform starting Y8ZTb3O particles used in cathodes Tb3OB and Tb3OC (17 μm thickness) was observed. The closed-packed particles observed in cathodes Tb3OA ($\leq 10$ μm thickness) and Tb2OA (40 μm thickness) were more uniform in size and shape due to their pre-heating and grinding procedures. The smaller (about 1 μm) Tb3OD particles sintered into a 13–15 μm thick layer. The Tb2OC cathode had a more uniform 12–16 μm thick layer with no observable cracks. Despite these variations in electrode particle-packing density (porosity) and thickness, the results summarized in FIG. 6 clearly show that the overpotentials of the six mixed-conducting Y8ZTb cathodes are smaller than those of the similarly prepared platinum and $La_{0.85}Sr_{0.15}MnO_3$ cathodes. This is presumably due to the increased charge-transfer reaction area for the mixed-conducting Y8ZTb cathodes.

Figure 6:
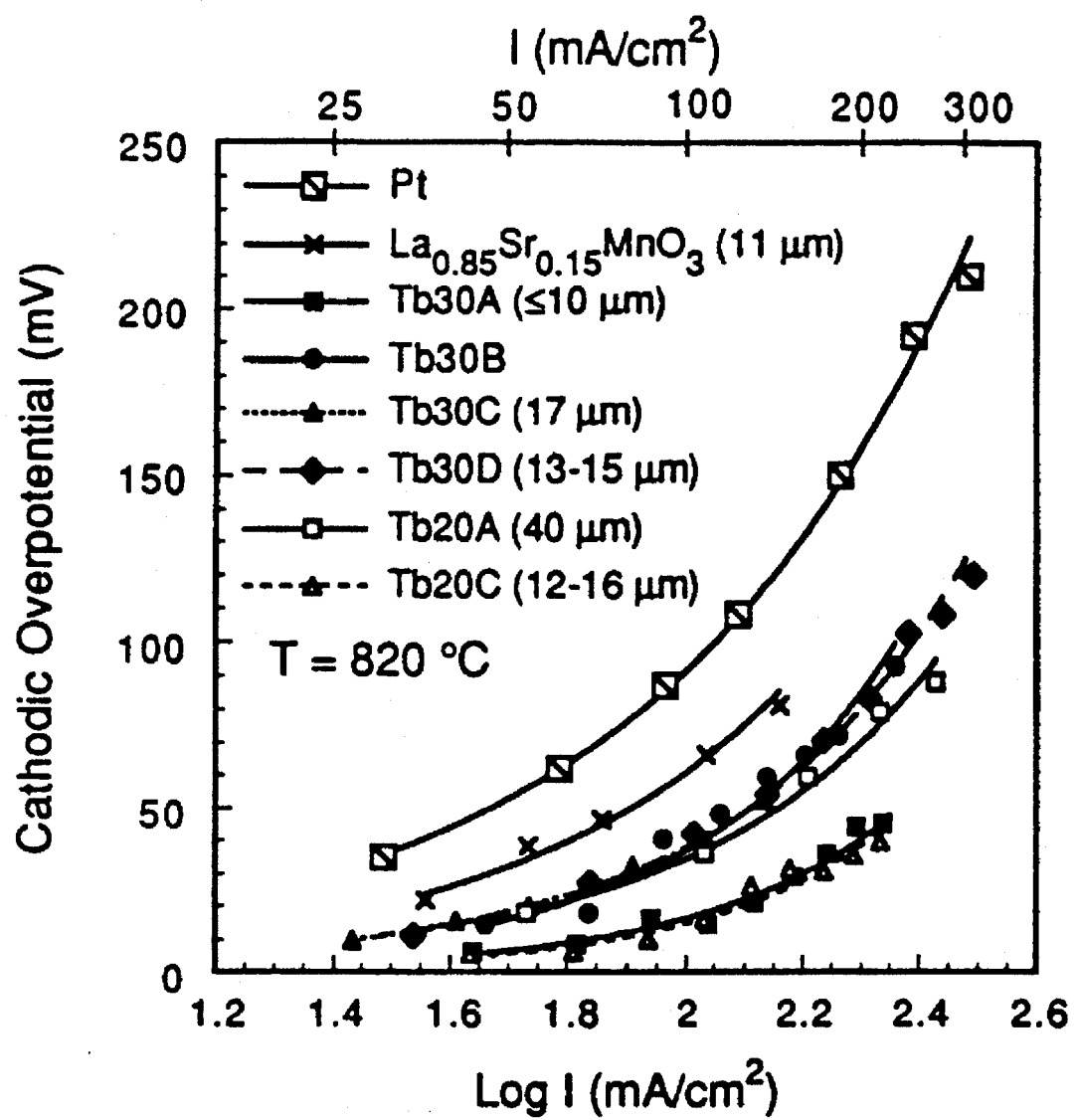
FIG. 6 is a plot showing comparison of the overpotentials of $Y_8ZTb_{20}$ and $Y_8ZTb_{30}$ cathodes with platinum and $La_{0.85}Sr_{0.15}MnO_3$ cathodes at 820° C. in air.

In FIG. 6 the Tb3OA and Tb2OC cathodes (two samples of each) have the lowest overpotentials (e.g., 40 mV at=225 $mA/cm^2$). The overpotentials of the Tb2OA cathode (40 μm thick) are higher than that of the Tb3OA cathode ($\leq 10$ μm thick), presumably due to its larger thickness. If the Tb2OA cathode had the same thickness as that of the Tb3OA cathodes, its overpotentials would have been even lower than those shown for Tb2OA in FIG. 6. Furthermore, the overpotentials of an optimized Y8ZTb2O cathode should be lower than those of an optimized Y8ZTb3O cathode, because the oxygen-ion conductivity in Y8ZTb2O is higher than that in Y8ZTb3O. Thus, the overpotentials of optimized Y8ZTb2O cathodes should be even less than the lowest values shown in FIG. 6.

Figure 7:
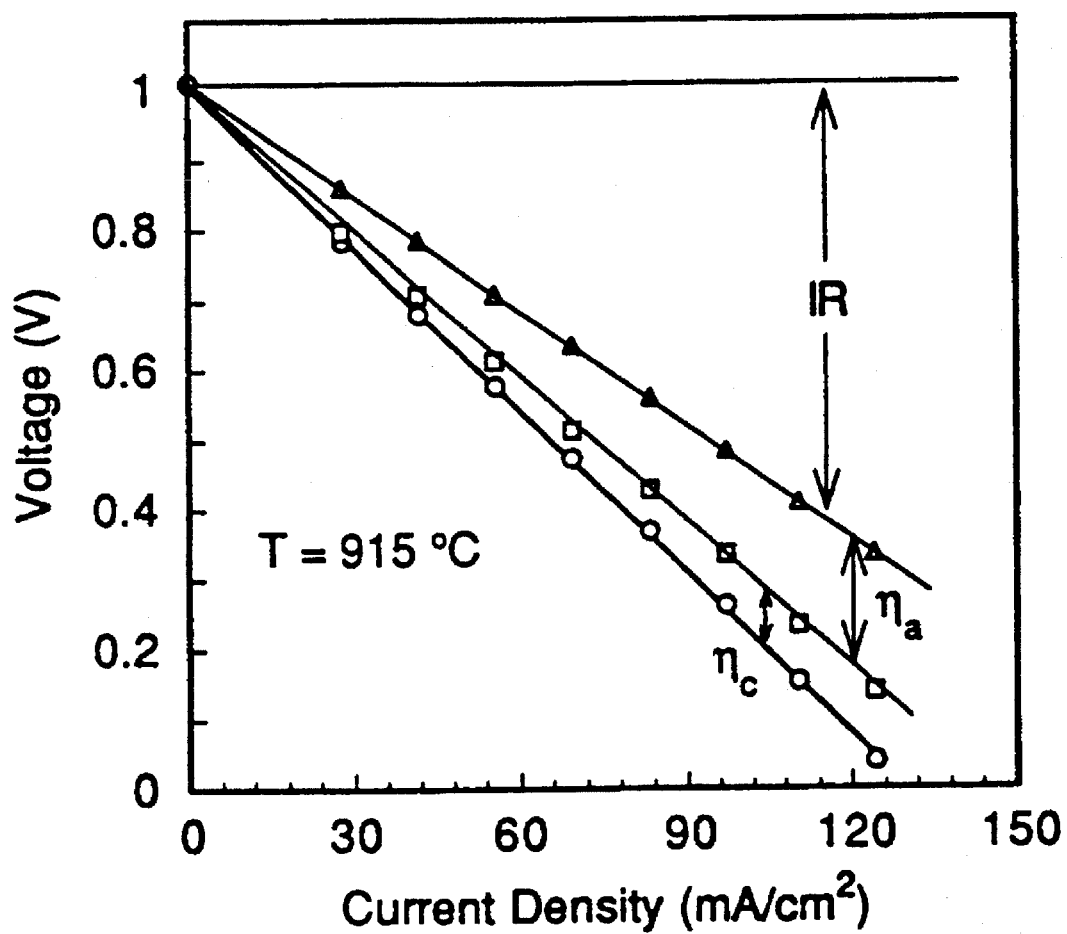
FIG. 7 is a plot showing single oxide cell performance at 915° C. for the cell: air, $Y_{12}ZTb_{20}$/$Y_8SZ$/$Y_{12}ZTi_{20}$, $P_{O2}=2\times10^{-18}$ atm.
Figure 8:
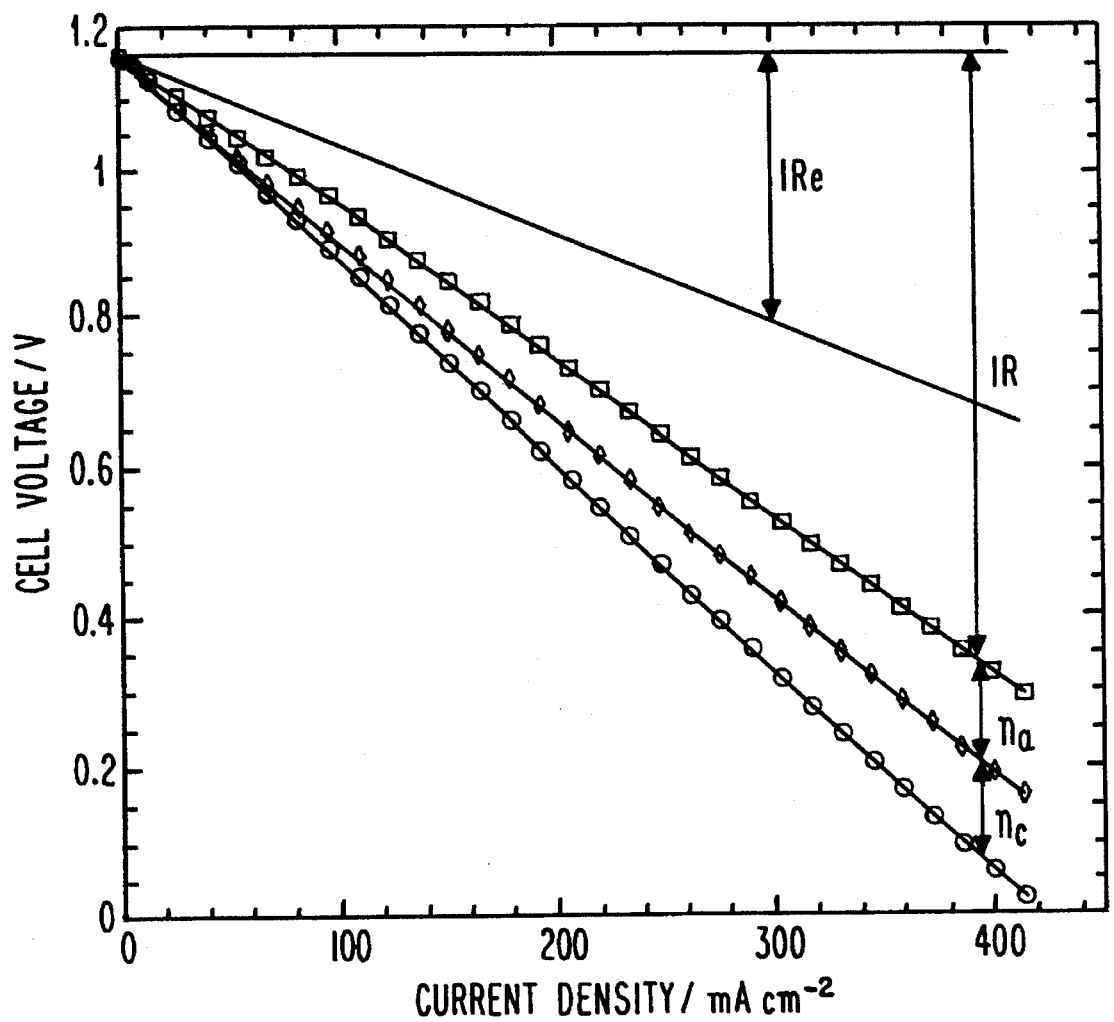
FIG. 8 is a plot showing single oxide cell performance at 915° C. for the cell: air, $Y_8ZTb_{20}$/$Y_8SZ$/$Y_{12}ZTi_{20}$, $P_{O2}=3.70\times10^{-21}$ atm.

The variation of voltage with current density for Y8ZTb/Y8SZ/Y8ZTi cells has been measured at temperatures between 800° to 920° C. Although these single cells are not single-component ones, they provide the basic information necessary for the optimization of the Y8SZ anodic and cathodic surfaces. The voltage variation with current density for the (air) Y8ZTb2O/Y8SZ/Y8ZTi2O ($PO_2$ about $2\times10^{-18}$ atm) cell at 915° C. is shown in FIG. 7, and for the (air) Y8ZTb2O/Y8SZ/Y12ZTi2O ($PO_2$ about $3.7\times10^{-21}$ atm) cell at 915° C. is shown in FIG. 8. The large IR loss shown in FIG. 7 is believed to be due to the thicknesses of the electrolyte and the two electrodes. The cells of the invention should have thinner YSZ electrolytes and electrodes to minimize these IR losses. Although the cathode overpotential ($\eta c$) is lower than that ($\eta a$) of the anode, both electrode overpotential losses likely can be improved.

The geometric cross-section area of the cell in FIG. 7 is 0.725 cm², and the thickness of the YSZ electrolyte is about 1.5 mm. The electrodes are made by mixing the Y8ZTb2O and Y8STi2O particles with polyethylene glycol and then painting the slurry on a Y8SZ electrolyte. The size of the Y8ZTb2O and Y8ZTi2O particles are nonuniform and vary from 1 to 10 μm. The cell is first heated to 1400° C. and held for 1 hour to sinter the electrode particles to each other and to the Y8SZ electrolyte. The resulting Y8ZTi2O and Y8ZTb2O electrodes have some porosity and good adherence to the electrolyte. Scanning electron micrographs of the cross-section of the cell show that the thickness of both electrodes is about 40–50 μm. Investigations of the effects of the preparation technique, the starting particle size, the electrode composition, porosity and thickness on single-cell performance likely will optimize the mixed-conducting YSZ anodic and cathodic surfaces.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A fuel cell, comprising:
   (a) a single-component body having first and second non-adjacent sides, comprising:
       (i) an anodic region formed at said first side having formula:

$$R_pM_{1-p-q}Ti_qO_{2-\delta}$$

where:
   R is at least one rare earth element selected from the group consisting of yttrium, scandium, samarium, ytterbium, calcium, and strontium;
   M is at least one metal selected from the group consisting of zirconium, cerium, and bismuth;
   Ti is titanium;
   p is about 0.113 to about 0.214;
   q is about 0.089 to about 0.236; and
   δ represents oxygen vacancies;
   (ii) a cathodic region formed at said second side having formula:

$$R_pM_{1-p-r}Tb_rO_{2-\delta}$$

where:
   R, M, p, and δ are as defined above;
   Tb is terbium; and
   r is about 0.179 to about 0.330;
   (iii) an oxygen ion-conducting region substantially free from anodic or cathodic character disposed between said anodic and cathodic regions;
(b) means for contacting fuel with said first side; and
(c) means for contacting oxidant with said second side.

2. The fuel cell of claim 1 wherein p is about 0.148 to about 0.182.

3. The fuel cell of claim 1 wherein q is about 0.134 to about 0.189.

4. The fuel cell of claim 1 wherein r is about 0.223 to about 0.283.

5. A single-component body having first and second non-adjacent sides, comprising:
   (i) an anodic region formed at said first side having formula:

$$R_pM_{1-p-q}Ti_qO_{2-\delta}$$

where:
   R is at least one rare earth element selected from the group consisting of yttrium, scandium, samarium, ytterbium, calcium, and strontium;
   M is at least one metal selected from the group consisting of zirconium, cerium, and bismuth;
   Ti is titanium;
   p is about 0.113 to about 0.214;
   q is about 0.089 to about 0.236; and
   δ represents oxygen vacancies;
   (ii) a cathodic region formed at said second side having formula:

$$R_pM_{1-p-r}Tb_rO_{2-\delta}$$

where:
   R, M, p, and δ are as defined above;
   Tb is terbium; and
   r is about 0.179 to about 0.330; and
   (iii) an oxygen ion-conducting region substantially free from anodic or cathodic character disposed between said anodic and cathodic regions.

6. The body of claim 5 wherein p is about 0.148 to about 0.182.

7. The body of claim 5 wherein q is about 0.134 to about 0.189.

8. The body of claim 5 wherein r is about 0.223 to about 0.283.

9. The body of claim 5 comprising oxide electrolyte having the formula:

$$R_xM_{1-x}O_{2-x/2}$$

wherein x is from about 0.05 to about 0.25.

10. The body of claim 9 wherein said oxide electrolyte has the formula $$Y_xZr_{1-x}O_{2-x/2}.$$

11. The body of claim 9 wherein the anodic region and the cathodic region are mixed-conducting regions.

12. The body of claim 5 in the form of a substantially planar sheet.

13. The body of claim 5 wherein said first side and said second side are substantially parallel.

14. The body of claim 5 in the form of a tube.

15. The body of claim 5 wherein said first side and said second side are substantially concentric.

16. A process for fabricating a single-component body, comprising the steps of:

providing a body having first and second non-adjacent sides, said body comprising oxide electrolyte;

contacting said first side with dopant to form an anodic region at said first side having formula:

$$R_p M_{1-p-q} Ti_q O_{2-\delta}$$

where:
R is at least one rare earth element selected from the group consisting of yttrium, scandium, samarium, ytterbium, calcium, and strontium;
M is at least one metal selected from the group consisting of zirconium, cerium, and bismuth;
Ti is titanium;
p is about 0.113 to about 0.214;
q is about 0.089 to about 0.236; and
$\delta$ represents oxygen vacancies; and contacting said second side with dopant to form a cathodic region at said second side having formula:

$$R_p M_{1-p-r} Tb_r O_{2-\delta}$$

where:
R, M, p, and $\delta$ are as defined above;
Tb is terbium; and
r is about 0.179 to about 0.330;
wherein said contacting of said first side and said second side is effected such that said anodic region is separated from said cathodic region by an oxygen ion-conducting region substantially free from dopant.

17. The product of the process of claim 16.

18. A process for fabricating a single-component body, comprising the steps of:

providing a body having at least one side, said body comprising oxide electrolyte;

contacting said side with dopant to form a either an anodic region having formula:

$$R_p M_{1-p-q} Ti_q O_{2-\delta}$$

or a cathodic region at said side having formula:

$$R_p M_{1-p-r} Tb_r O_{2-\delta}$$

where:
R is at least one rare earth element selected from the group consisting of yttrium, scandium, samarium, ytterbium, calcium, and strontium;
M is at least one metal selected from the group consisting of zirconium, cerium, and bismuth;
Ti is titanium;
Tb is terbium;
p is about 0.113 to about 0.214;
q is about 0.089 to about 0.236;
r is about 0.179 to about 0.330; and
$\delta$ represents oxygen vacancies.

19. The product of the process of claim 18.

* * * * *